(12) United States Patent
Majumdar et al.

(10) Patent No.: US 10,589,478 B2
(45) Date of Patent: Mar. 17, 2020

(54) PNEUMATIC TIRE HAVING SEALANT LAYER

(71) Applicant: Triangle Tyre Co. Ltd., Weihai (CN)

(72) Inventors: Ramendra Majumdar, Hudson, OH (US); Edward Montgomery, North Canton, OH (US); Lingbo Dong, Weihai (CN); Dapeng Wang, Weihai (CN)

(73) Assignee: Triangle Tyre Co. Ltd., Weihai (CN)

( * ) Notice: Subject to any disclaimer, the term of this patent is extended or adjusted under 35 U.S.C. 154(b) by 1006 days.

(21) Appl. No.: 14/991,575

(22) Filed: Jan. 8, 2016

(65) Prior Publication Data

US 2016/0167321 A1 Jun. 16, 2016

Related U.S. Application Data

(63) Continuation-in-part of application No. 14/572,138, filed on Dec. 16, 2014, now Pat. No. 10,399,391.

(51) Int. Cl.
| | |
|---|---|
| *B60C 19/12* | (2006.01) |
| *B29D 30/06* | (2006.01) |
| *B29C 73/16* | (2006.01) |
| *B29C 73/20* | (2006.01) |
| *C09D 123/22* | (2006.01) |

(Continued)

(52) U.S. Cl.
CPC ............ *B29C 73/163* (2013.01); *B29C 73/22* (2013.01); *B60C 19/122* (2013.01); *C09D 123/22* (2013.01); *C09D 123/26* (2013.01); *C09J 123/22* (2013.01); *C09J 123/26* (2013.01); *B29C 73/16* (2013.01); *B29C 73/20* (2013.01); *B29D 30/0685* (2013.01); *B60C 19/12* (2013.01)

(58) Field of Classification Search
None
See application file for complete search history.

(56) References Cited

U.S. PATENT DOCUMENTS

| | | | | |
|---|---|---|---|---|
| 4,140,167 A | * | 2/1979 | Bohm | B29D 30/0685 |
| | | | | 152/505 |
| 4,665,963 A | * | 5/1987 | Timar | B29C 73/163 |
| | | | | 152/504 |

(Continued)

FOREIGN PATENT DOCUMENTS

| | | | | |
|---|---|---|---|---|
| GB | 765762 A | * | 1/1957 | ......... B29D 30/0685 |

OTHER PUBLICATIONS

D. Adkinson, S. Malmberg, J. Bielby, and K. Kulbaba, "Butyl Ionomers—A New Grade of Butyl Rubber for Tire Applications", Rubber Division, American Chemical Society, Fall 186th technical Meeting, Paper # 45, Oct. 14-16, 2014.

(Continued)

*Primary Examiner* — Kendra Ly
(74) *Attorney, Agent, or Firm* — George W. Moxon, II; Brian P. Harrod

(57) ABSTRACT

A tire with a built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant comprising a butyl ionomer containing degradation product, disposed inwardly from said tire carcass inner layer, wherein said sealant provides self-sealing properties to the tire.

9 Claims, 2 Drawing Sheets

(51) Int. Cl.
*C09D 123/26* (2006.01)
*C09J 123/22* (2006.01)
*B29C 73/22* (2006.01)
*C09J 123/26* (2006.01)

(56) References Cited

U.S. PATENT DOCUMENTS

| | | | |
|---|---|---|---|
| 4,895,610 | A | 1/1990 | Egan |
| 6,837,287 | B2 | 1/2005 | Smith, Jr. et al. |
| 6,915,826 | B2 | 7/2005 | Poling et al. |
| 6,962,181 | B2 | 11/2005 | Deevers et al. |
| 7,073,550 | B2 | 7/2006 | Reiter et al. |
| 7,332,047 | B2 | 2/2008 | Majumdar et al. |
| 7,419,557 | B2 | 9/2008 | Majumdar et al. |
| 7,662,480 | B2 | 2/2010 | Resendes et al. |
| 7,674,344 | B2 | 3/2010 | D'Sidocky et al. |
| 8,021,730 | B2 | 9/2011 | Tsou et al. |
| 8,158,721 | B2 | 4/2012 | Stevenson et al. |
| 8,293,049 | B2 | 10/2012 | Incavo |
| 8,534,331 | B2 | 9/2013 | Dubos et al. |
| 8,646,501 | B2 | 2/2014 | Ruegg, Jr. |
| 8,776,851 | B2 | 7/2014 | Majumdar |
| 8,946,319 | B2 | 2/2015 | Adkinson et al. |
| 2005/0113502 | A1 | 5/2005 | Fitzharris Wall et al. |
| 2005/0215684 | A1 | 9/2005 | Fitzharris Wall |
| 2005/0222335 | A1* | 10/2005 | Jones ............ C08L 23/22 525/191 |
| 2007/0044883 | A1* | 3/2007 | D'Sidocky ........ B29C 73/163 152/503 |
| 2009/0084483 | A1* | 4/2009 | Majumdar ........ B29D 30/0685 152/504 |
| 2009/0205765 | A1* | 8/2009 | Sostmann ........ B29C 73/22 152/502 |
| 2012/0148773 | A1* | 6/2012 | Parent ............ B01J 41/14 428/36.9 |
| 2016/0068031 | A1* | 3/2016 | Kaszas ............ B60C 1/00 152/504 |

OTHER PUBLICATIONS

D. Adkinson, S. Malmberg, J. Bielby, and K. Kulbaba, "Butyl Ionomers—A New Class of Butyl Rubber for Tire Inner Liner Applications", ITEC 2014, Paper # 41, Sep. 9, 2014.

* cited by examiner

PNEUMATIC TIRE HAVING SEALANT LAYER

CROSS REFERENCE TO RELATED APPLICATIONS

This application is a continuation-in-part of, and claims the benefit of, U.S. patent application Ser. No. 14/572,138, filed Dec. 16, 2014, which is entitled "Pneumatic Tire Having Multiple Built-In Sealant Layers and Preparation Thereof," and is incorporated herein by reference.

BACKGROUND OF THE INVENTION

The present invention is directed to tires having inner sealant layers, and in particular to tires having a butyl ionomer containing sealant layer formed from sealant precursor layer.

Tire puncture is an inherent issue for rubber pneumatic tires. Because of that, sealants have been developed and placed as a layer inner to the tire tread and plies to minimize the impact of the puncture. Further, punctures can occur at any temperature. A single layer of sealant of low viscosity may work very well at low temperature, but at high temperatures, it might achieve a very low viscosity, which would allow it to flow and pass out of tire during use. By depleting the tire sealant, the tire loses its puncture sealing capacity. Likewise, a single layer of sealant of high viscosity may be very good for high temperature but might be almost solid at cold temperature and thus unable to flow to plug puncture in tires at cold temperature.

Tires with built-in sealant layer are known in the art. Typically, these tire sealants are formed during tire cure by thermal degradation of peroxide-containing butyl-rubber-based sealant precursor layers, such as for example, U.S. Pat. Nos. 4,895,610; 6,962,181; 7,073,550; 7,674,344; and 8,293.049; and U.S. Patent Publication Nos. 2005/0113502 and 2005/021568, the teachings of which are all hereby incorporated by reference. Sealant layers may be of black or non-black colors and may incorporate short fibers, such as polyester or polyurethane fibers, and other filler aggregate into sealant layers to help to plug nail hole punctures.

BRIEF SUMMARY OF THE INVENTION

The present invention is directed to a tire with a built-in puncture sealant comprising a supporting tire carcass comprised of one or more layers of ply, an outer circumferential tread, and a radially inner layer, a pair of beads, sidewalls extending radially inward from the axial outer edges of the tread portion to join the respective beads, a sealant is formed during tire cure by thermal degradation of butyl ionomer containing precursor catalyzed by peroxide, disposed inwardly from said tire carcass inner layer, to provide self-sealing properties to the tire.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
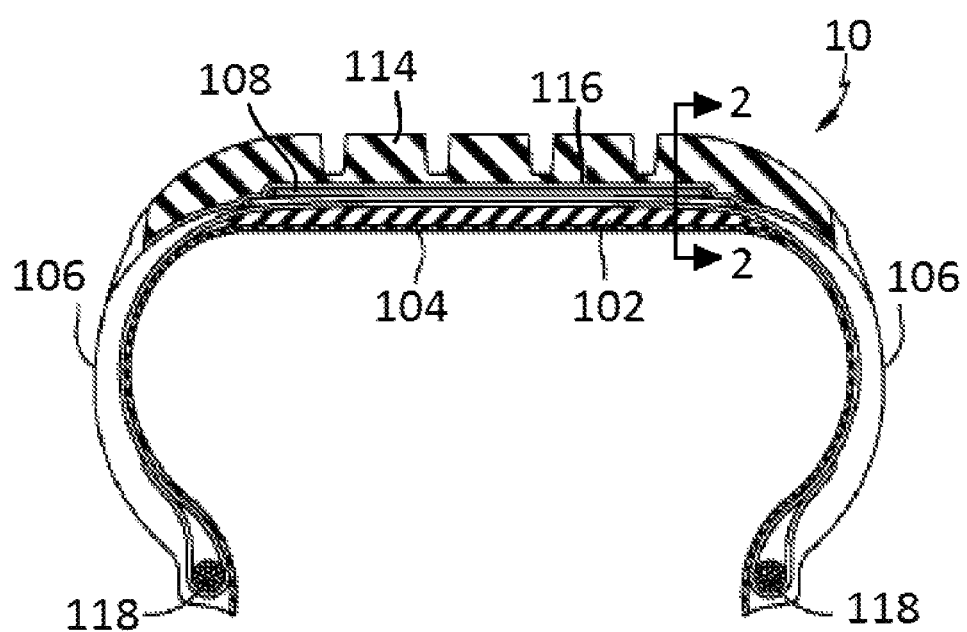
FIG. 1 is a cross-sectional view of a tire using the present invention.

The present invention is directed to a tire having a sealant layer formed from a precursor during tire cure by thermal degradation of butyl ionomer containing composition catalyzed by peroxide. Thus the tire has a thermally degraded butyl ionomer sealant layer disposed inside the tire formed from a precursor layer. The tire comprises a supporting tire carcass comprised of one or more layers of ply, an outer circumferential tread, and a radially innermost innerliner layer, a pair of beads, sidewalls extending radially inward from the axial outer edges of the tread portion to join the respective beads, a sealant layer, and a cover layer, disposed on said tire carcass innermost layer, wherein the sealant is formed during tire cure by thermal degradation of butyl ionomer based compound in the presence of peroxide to form an inner layer of thermally degraded butyl ionomer sealant, disposed inwardly from said tire carcass inner layer, to provides self-sealing properties to the tire.

As used herein, the term "sealant precursor" means the compound by itself is not a sealant, but it is transformed into sealant by thermal degradation during the curing step of tire making. The "precursor layer" is the layer of sealant precursor. The precursor layer can be 100% butyl ionomer rubber or can be butyl ionomer rubber blended with other rubbers that can be transformed into a sealant, such as a mixture or both butyl ionomer and butyl rubber, which also degrades during tire curing at high temperature to form low molecular weight easy to flow tacky sealants. As used herein, "degraded" or "degradation" means breaking of rubber chain giving rise to lower molecular weight rubber.

In the present invention, a sealant precursor layer is assembled into an unvulcanized rubber tire (generally called a Green Tire) using conventional tire building techniques. After an unvulcanized tire is built, including such a sealant precursor layer, the tire is vulcanized employing standard methods. Such a sealant precursor layer is assembled into the tire inwardly from the tire's supporting carcass and outwardly from an inner liner layer (which can be an air barrier layer) in the unvulcanized tire. Alternatively, the sealant precursor layer can also be placed inner to tire inner liner, and, in this case a sealant cover layer is needed, inner to sealant precursor layer with width greater than the sealant precursor layer. The purpose of the sealant cover layer is to prevent contamination of the tire curing bladder from low molecular weight tacky sealant formed from the precursor layer.

The physical nature of the sealant precursor layer is that its viscosity is high enough to permit easy handling during the standard steps in the construction of an unvulcanized tire and during the vulcanization (curing) operation: that is, the sealant precursor layer has enough uncured strength (modulus) to retain its shape during building, enough tack to stick to adjacent layers during building and enough strength to retain its shape during the application of the high pressure during vulcanization.

As the tire is vulcanized with sealant precursor layer, sealant layer is formed in situ, by thermal degradation of butyl ionomer. In effect, the butyl ionomer rubber in the polymer composition layer is degraded to a low viscosity, easy to flow tacky material, which has puncture sealing properties. Thus, the sealant precursor layer is transformed into a puncture sealant layer during the high temperature curing of the tire. The degradation of the sealant precursor layer is effectuated by the presence of one or more peroxides which acts as a catalyst.

Most rubber compositions, e.g. those based on natural rubber, butadiene rubber, styrene butadiene rubber etc. when heated in the presence of peroxides, harden due to cross linking reactions. However, butyl rubber based compositions, when heated with peroxide, the material softens predominantly due to thermal degradation (chain cessation). Bromination of butyl rubber produces bromobutyl rubber. Unlike butyl rubber, bromobutyl rubber crosslinks in the presence of peroxide thus giving rise to hardened rubber. Ionic butyl is produced by chemical reaction of bromobutyl as shown below:

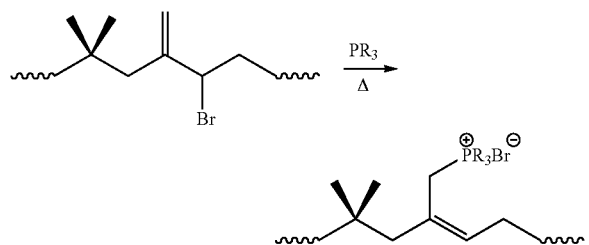

During experimentation, it was unexpectedly found that unlike bromobutyl, ionic butyl based compounds degrade in the presence of peroxide to softer material. Thus compositions containing ionic butyl and suitable peroxides were formulated as sealant precursors that degrade during high temperature tire cure and form easy to flow tire sealant material.

Butyl ionomers are derived from halobutyl rubber. Halobutyl rubbers are derived from butyl rubber. Butyl rubber is produced by copolymerizing isobutylene with small amounts of isoprene. Generally, butyl rubber contains from about 0.5 to 4 mole % isoprene and from about 96 to 99.5 mole % percent isobutylene unit. The butyl rubber that can be employed in the polymer composition of the tires of this invention has a number average molecular weight in the range of 200,000 to 600,000 and preferably in the range of about 300,000 to about 500,000, and a Mooney viscosity (ML 1+8 at 125° C.) ranging from about 25 to 65. Butyl rubber is then converted to bromobutyl rubber, which is then transformed to butyl ionomers by converting the bromine functionalities into ionic imidazolium bromide groups which results in the formation of reversible ionic associations that exhibit physical cross-linking ability.

At least one butyl ionomer is available commercially from Lanxess with trade name X_Butyl™ I4565P that has ML(1+8) value of 56±4 MU at 125° C. and ion content of 0.4±1 mole %, total reactive bromine content of 0.5±0.2 mole % and 1,4-isoprene content of 0.5±0.2 mole %.

Compositions based on 100 phr butyl ionomer rubber can be used in making sealant precursor. Butyl ionomer can be used in combination with other elastomers that degrade at tire cure temperature. One example of such polymer is butyl rubber. Thus, 100 to 5 phr ionic butyl in combination with 0 to 95 phr butyl rubber can be used to create tire puncture sealant composition.

It is preferable for the polymer composition layer assembled into the tires of this invention to have the following composition in parts per hundred rubber (phr):

100 phr butyl ionomer rubber e.g. X_butyl™ I4565P from Lanxess
about 10 to 100 phr of silicon dioxide e.g. Sidistrar 320 or other filler
about 1 to 15 phr of tackifier e.g. Wingtack 85 from Total
about 20 to 200 phr calcium carbonate e.g. Hubercarb Q3 from Huber
about 5 to 35 phr oil, and
from about 1 to 16 phr suitable peroxide.

Any peroxide or combination of peroxides that catalyze the degradation (chain cessation) of ionic butyl based precursor compound at tire cure temperature (approximately 150° C.) can be employed. Preferably peroxide compounds are employed which only disintegrate at high temperatures, that is, above about 100° C. (212° F.). Examples of such peroxides are tert-butyl perbenzoate and dialkyl peroxides with the same or different radicals, such as dialkylbenzene peroxides and alkyl peresters. Preferably the peroxide degradation catalyst employed will contain two peroxide groups. Frequently the peroxide groups are attached to a tertiary butyl ionomer group. The basic moiety on which the two peroxide groups are suspended can be aliphatic, cycloaliphatic, or aromatic radicals. Some representative examples of such peroxide degradation catalyst include: 2,5-bis(t-butyl peroxy)-2,5-dimethyl hexane; 1,1-di-t-butyl peroxy-3, 3,5-trimethyl cyclohexane; 2,5-dimethyl-2,5-di(t-butyl peroxy)hexyne-3; p-chlorobenzyl peroxide; 2,4-dichlorobenzyl peroxide; 2,2-bis-(t-butyl peroxy)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy) hexane. Such peroxide degradation catalyst can be added to the polymer composition layer in pure form (100 percent active peroxide) or on an inert, free-flowing mineral carrier. Calcium carbonate and silica are some examples of inert carrier. Such carrier composition containing from about 35 to 60 weight percent active ingredient (peroxide) can be employed very successfully. For example, 40 percent by weight dicumyl peroxide on an inert carrier can be employed as the peroxide degradation catalyst in the polymer composition layer with good results.

While the mechanism may not be fully understood, it is within the scope of the present invention to employ an activating agent, such as 2,2,6,6-tetra alkyl piperidine based hindered amine, which will activate the organoperoxide, and in a sense, enable a reduction in the amount of the organoperoxide to more efficiently degrade the butyl ionomer rubber during the formation of the sealant layer. Such activating agents are know in the art, such as U.S. Pat. No. 7,674,344 to D'Sidocky et al., the disclosure of which is incorporated by reference.

One representative example of such 2,2,6,6-tetra alkyl piperidine based hindered amine is, for example, a 50/50 mixture of poly[[6-1,1,3,3,-tetramethylbutyl)amino]-s-triazine-2,4-diyl][2,2,6,6,-tetramethyl-4-piperidyl)imino] hexamethylene[(2,2,6,6-tetramethyl-4-piperidyl)imino]] compound (referred to herein as "PTP") and bis(hydrogenated tallow alkyl), amines oxidized and sold as Irgastab® FS410 FF from BASF.

Another example of peroxide activating agent is a mixture of PTP, bis(hydrogenated tallow alkyl) amine oxidized, and bis(2,2,6,6-tetramethyl-4-piperidinyl) sebacate sold as Irgastab® FS811 from BASF.

Another example of peroxide activating agent is poly[[6-[1,1,3,3,-tetramethylbutyl)amino]-1,3,5-triazine-2,4-diyl][2, 2,6,6,-tetramethyl-4-piperidyl)imino]-1,6-hexanediyl[(2,2, 6,6-tetramethyl-4-piperidinyl)imino]] available as Chimassorb® 944 FDL from BASF.

In practice, exemplary of composites which contain, and therefore are comprised of, said PTP are composites comprised of said PTP which may also comprise said bis(2,2,6,6-tetramethyl-4-piperidinyl) sebacate and which may also optionally contain an oxidized bis(halogenated tallow alkyl amine). In practice, the aspect of utilizing said 2,2,6,6-tetra alkyl piperidine based hindered amines, and particularly said PTP or composites of 2,2,6,6-tetra alkyl piperidine based hindered amines which contain (include) said PTP to activate the organoperoxide in the degradation of the butyl ionomer rubber of the sealant precursor is considered herein to be important in order to reduce as much as possible the concentration of the organoperoxide in the sealant precursor butyl ionomer rubber-based composition, as well as excess unreacted organoperoxide which may remain in the resultant built-in sealant layer which may, in turn, gradually become available to contact rubber components of the tire adjacent to the built-in sealant layer.

The various components of the sealant layer can be mixed together using any convenient rubber mixing equipment, such as a Banbury mixer. This rubber composition used in the sealant layer has sufficient viscosity and unvulcanized adhesion to enable its incorporation into an unvulcanized tire without departing from standard, long standing tire building techniques and without the use of complicated, expensive tire building equipment.

The strip of butyl ionomer based sealant precursor composition should extend from one shoulder of the tire to the other, in other words, it should cover the crown area of the tire. The thickness of the sealant precursor layer can vary depending on tire size. Generally, the thickness of the polymer composition layer will range from about 0.1 cm (0.04 inches) to about 0.635 cm (0.25 inches). It is generally preferred for the polymer composition layer to have a thickness of 0.2 cm (0.08 inches) to 0.4 cm (0.16 inches). In passenger tires it is normally most preferred for the polymer composition layer to have a thickness of about 0.25 cm (0.1 inches).

After the unvulcanized pneumatic rubber tires of this invention are assembled, they are vulcanized using a normal tire cure cycle. The tires of this invention can be cured over a wide temperature range. However, it is generally preferred for the tires of this invention to be cured at a temperature ranging from about 132° C. (270° F.) to about 166° C. (330° F.). It is more preferred for the tires of this invention to be cured at a temperature ranging from a 143° C. (290° F.) to 154° C. (310° F.). It is generally preferable for the cure cycle used to vulcanize the tires of this invention to have a duration of about 10 to 14 minutes with a cure cycle of about 12 minutes being most preferred.

The present invention employs a standard tire-building process. After the green (uncured) tire is built, an optional protective film can be applied on the top of the innermost sealant cover layer. The width of the film is slightly wider than the sealant layer (approximately 2 inches more on both sides). This film protects the tire curing bladder and keeps it clean in case the innermost sealant cover layer ruptures or tears in the mold. Such films are known in the art. One such film is 2 mil undrawn nylon-6, 6 available as DARTEK® C917 from Coveris High Performance Packaging. About 1" (inch) of the film is overlapped at the end so that, after tire cure, it functions as a pull tab to facilitate easy removal. Such a system is described in U.S. Pat. No. 7,332,047 to Majumdar, Logan, and Lukich, and is hereby incorporated herein by reference. The protective film can also be applied as first layer in tire building drum. For convenience, the two edges of the film are preferentially coated with a pressure-sensitive adhesive (PSA)-coated thermoformable film. Such a system is described in U.S. Pat. No. 7,419,557 to Majumdar and Page, and is hereby incorporated herein by reference. Although the film is not critical, Dynamically Vulcanized Alloy (DVA) film is preferred in tire building drum over nylon-6,6 film because DVA has significantly lower low strain modulus and hence can expand using less force during the green tire building process. Such a material is described in U.S. Pat. No. 8,776,851 to Majumdar, and is hereby incorporated herein by reference. Other examples are U.S. Pat. Nos. 8,021,730 and 8,158,721, hereby incorporated herein by reference. An activating agent for organoperoxide can be added in the sealant composition for faster degradation. Such a method is described in U.S. Pat. No. 7,674,344 to D'Sidocky et al., and is hereby incorporated herein by reference.

The present invention incorporates an inner liner and a sealant precursor layer. The inner liner comprises bromobutyl rubber, carbon black, naphthenic oil, stearic acid, phenolic resin tackifier, mixture of aromatic hydrocarbon resins (as found in STRUKTOL® 40 MS resin, manufactured by Struktol Company of America), MgO, ZnO, Sulfur, 2,2'-dithiobis(benzothiazole) (commonly sold as MTBS). The sealant precursors comprise butyl ionomer rubber, paraffinic oil, silica, clay, titanium dioxide, talc, color concentrate (such as AKROSPERSE® E2295 Green manufactured by Akrochem Corporation, AKROSPERSE® E6615 Orange manufactured by Akrochem Corporation), blend of fatty acid derivatives processing additives (such as STRUKTOL® HPS 11 processing additive manufactured by Struktol Company of America), in the first non-productive (NP) mixing pass. Organic peroxide, such as n-butyl 4,4-bis(t-butyl-peroxy)valerate (such as TRIGONOX® 17-40B-GR manufactured by AkzoNobel) can be added in the final productive (PR) pass.

Preferably the tire of the present invention is prepared in the following sequences:

1. A sealant cover layer having formulation shown in Table 1 is mixed and calendered to a thickness of 1 mm, and a width equal to the inner liner width or slightly wider than sealant precursor layer.
2. A precursor for the sealant having formulation shown in Table 2 is mixed and calendered to a thickness of 3 mm thick, and a width equal to the tread width less about 15 mm (i.e., tread width minus 15 mm).
3. The sealant cover layer (#1 above) is applied to the tire-building drum.
4. Next, the precursor for the sealant (#2 above) is applied to the tire-building drum.
5. Next, the inner liner is applied in a tire-building drum as in typical tire building process followed by the rest of the layers employed in a normal tire build.

EXAMPLES

A butyl ionomer rubber-based sealant precursor composition is prepared by mixing the ingredients in an internal mixer. The ingredients are mixed in a first, non-productive, mixing stage without the organoperoxide, followed by a second, productive, mixing stage in which the organoperoxide is added. The ingredients are illustrated in the following Table 2. The ingredients are in parts per hundred rubber.

TABLE 1

Sealant cover layer

| Ingredient | Parts per Hundred Rubber (phr) |
|---|---|
| Bromobutyl rubber | 100 |
| Carbon black | 55 |
| Naphthenic Oil | 6 |
| Stearic Acid | 1 |
| Phenolic resin tackifier | 4 |
| STRUKTOL ® 40 MS Resin | 8 |
| MgO | 0.15 |
| ZnO | 2.0 |
| Sulfur | 0.5 |
| MBTS (2,2'-Dithiobis(benzothiazole)) | 1.5 |

TABLE 2

Sealant precursor

| | Example 1 (phr) |
|---|---|
| Non-Productive (NP) | |
| Butyl Ionomer Rubber | 100.00 |
| Paraffinic oil | 25.00 |
| Silica | 50.00 |
| Calcium Carbonate | 100.00 |
| Tackifier | 5.00 |
| AKROSPERSE ® 626 Blue | 2.00 |
| STRUKTOL ® HPS 11 Processing Additive | 4.00 |
| TOTAL (NP) | 286.00 |
| n-butyl 4,4-bis(t-butyl-peroxy)valerate | 12.00 |
| ODR 150° C./R25/30'/3°Arc | |
| Initial Torque (lbf.in) | 15 |
| Minimum Torque, ML (lbf · in) | 4.49 |
| Torque at 30' (lbf · in) | 4.49 |
| Green Strength | |
| Tensile (psi) | 124 |
| % Elongation | 1255 |
| M100 (psi) | 46 |
| M200 (psi) | 52 |
| M300 (psi) | 55 |

The resulting composition could be processed and used as a sealant precursor in a tire building process. Table 2 also shows Oscillating Disc Rheometer (ODR) data of example 1. Initial torque of the precursor composition before degradation is 15 lbf.in; after 30 minutes at 150° C. (simulates tire cure), thermal degradation of precursor to sealant is formed resulting in lowering of final torque to 4.49 lbf.in. This change is predominantly due to chain breakage (degradation) catalyzed by organic peroxide. If there had been predominantly cross linking, then the torque would have increased to higher value as found in bromobutyl compound. Tensile properties of uncured sheet of sealant precursor layer called green strength are also shown in Table 2. In Table 2, M100, M200, M300 are respectively modulus at 100%, 200% and 300% strains.

Additional butyl ionomer rubber-based sealant precursor compositions were prepared by mixing the ingredients in an internal mixer. The ingredients are mixed in a first, non-productive, mixing stage without the organoperoxide followed by a second, productive, mixing stage in which the organoperoxide is added. The ingredients are illustrated in the following Table 3. The ingredients are in parts per hundred rubber.

TABLE 3

ADDITIONAL EXAMPLES

| | Example 2 | Example 3 | Example 4 | Example 5 |
|---|---|---|---|---|
| Non-Productive (NP) | | | | |
| Butyl Rubber (Butyl BK-1675) | 100 | 70 | 30 | |
| Ionic Butyl 14565P | | 30 | 70 | 100 |
| Wingtack 86 tackifier resin | 30 | 30 | 30 | 30 |
| Hubercarb ® Q3 calcium carbonate | 100 | 100 | 100 | 100 |
| Sidistar ® 320 silica | 50 | 50 | 50 | 50 |
| Akrosperse ® 802 Yellow | 2 | 2 | 2 | 2 |
| Struktol WB42 processing additive | 4 | 4 | 4 | 4 |
| Total (NP) | 286 | 286 | 286 | 286 |
| Productive 2$^{nd}$ Pass | | | | |
| NP | 286 | 286 | 286 | 286 |
| Vul-Cup 40KE[1] | 3 | 3 | 3 | 3 |
| Di-Cup 40KE[2] | 9 | 9 | 9 | 9 |
| TOTAL | 298 | 298 | 298 | 298 |
| ODR 302° F./3°Arc/50 Rotor/30 minutes | | | | |
| Torque at 0 min (lbf · in) | 20 | 20 | 20 | 20 |
| Torque at 30 min (lbf · in) | 1.33 | 1.55 | 2.49 | 3.36 |
| Green Strength | | | | |
| Tensile (psi) | 33 | 171 | 187 | 338 |
| Elongation (%) | >900 | 927 | 534 | 707 |
| M100 (psi) | 316 | 541 | 542 | 699 |
| M200 (psi) | 269 | 661 | 693 | 938 |
| M300 (psi) | 211 | 818 | 905 | 1304 | notes:
[1]Vul-Cup 40KE is 40% a,a'-bis(tert-butylperoxy)diisopropylbenzene
[2]Di-Cup 40KE is 40% dicumyl peroxide All of the compositions had initial torque of approximately 20 lbf.in, which reduce to less than 4 lbf.in due to thermal degradation in ODR equipment (30 minutes at 302° F.) thus forming sealant materials. Ionic butyl containing materials (Examples 3, 4 and 5) have significantly higher green strength compared to 100% butyl rubber based composition (Example 2). Table 3 shows that tensile strength of 100 phr butyl-based sealant is 33 psi (example 2) and it is jumped to 171 psi by just replacing 20 phr butyl with 20 phr ionic butyl (example 3). Thus, it is anticipated that just a small amount of replacement of butyl with ionic butyl (such as 5 phr) will significantly increase the tensile strength. Thus ionic butyl rubber containing sealant precursors, even if present in small amount, will be relatively easier to handle compared to sealant based on 100 phr butyl.

For ease of illustration, some internal materials of the tire have been omitted from the drawings, such as belts and plies, but they remain in the finished tire.

Figure 2:
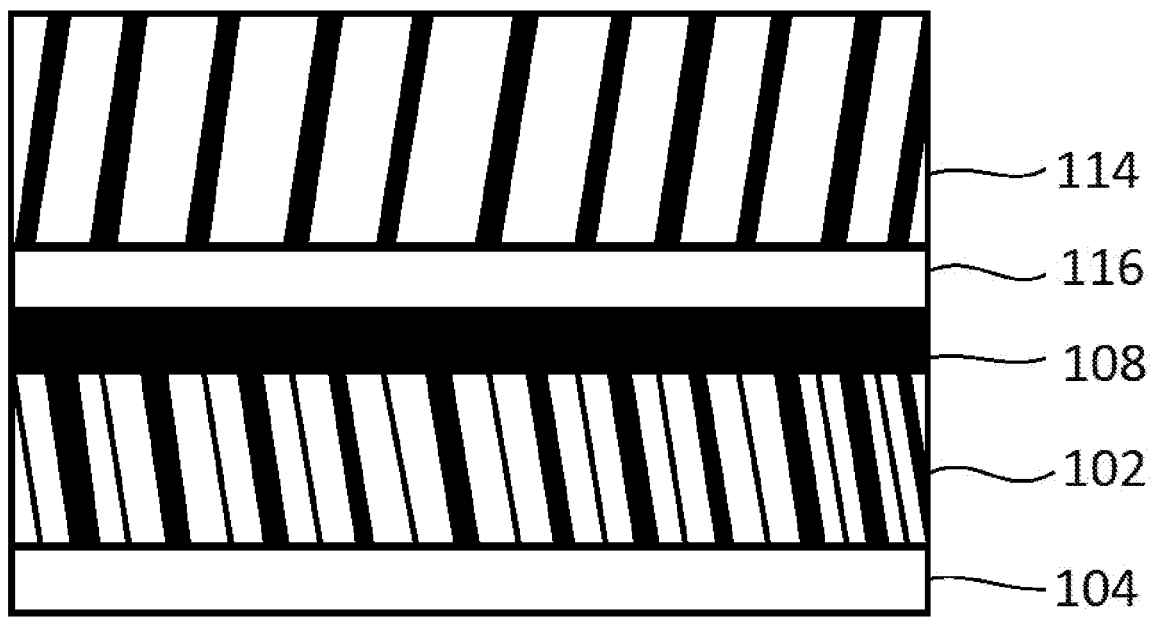
FIG. 2 is a cross-sectional enlarged view of the tire in FIG. 1 taken along line 2-2 in FIG. 1.

FIG. 1 illustrates the cross-sectional view of the cured tire 10 of the present invention, where the layers are not shown to scale since it is the ordering of the layers, not the specific widths and thicknesses that is important. The width can range from full tire width, down to a small strip along the center of the tire. FIG. 2 is a cross-sectional view illustrating the layers shown in FIG. 1; as with FIG. 1, the layers are not shown to scale since it is the ordering of the layers, not the specific widths and thicknesses that is important. A sealant layer 102 formed from its precursor during tire cure and a sealant cover layer or inner liner 104 are shown in a general form. Cover layer 104 is shown extending the width of the tire sidewalls 106, but it is employed as is known in the art. Once the green tire is vulcanized, the sealant layer 102 is formed from its precursor. FIG. 1 also illustrates the present invention in which the sealant layer is between inner liner 104 and a layer of squeegee 108. Squeegee layer 108 is between the innermost layer of supporting carcass 116 and the sealant layer 102, which is formed from precursor layer once the tire is cured. The use of a squeegee layer is known in the art and is optional and employed as needed in the process of creating the sealant layer. FIG. 1 also shows tread 114, supporting carcass 116, and the inextensible beads 118, which are part of the tire.

The cover layer has a 100% modulus of 0.5 MPa to 2.5 MPa. The sealant layer is generated using a peroxide having a Self-Accelerating Decomposition Temperature (SADT) in the range 50-140° C. The 100% modulus (M100) of sealant precursor is in the range 400-900 psi and preferably in the range 450-700 psi.

The foregoing embodiments of the present invention have been presented for the purposes of illustration and description. These descriptions and embodiments are not intended to be exhaustive or to limit the invention to the precise form disclosed, and obviously many modifications and variations are possible in light of the above disclosure. The embodiments were chosen and described in order to best explain the principle of the invention and its practical applications to thereby enable others skilled in the art to best utilize the invention in its various embodiments and with various modifications as are suited to the particular use contemplated.

What is claimed is:

1. A method for making a tire comprising
   forming a green tire;
   adding a sealant precursor comprising a butyl ionomer composition comprising 5 to 100 parts per hundred rubber (phr) of butyl ionomer, and one or more peroxides to said green tire;
   curing said green tire;
   wherein said sealant precursor containing butyl ionomer degrades during tire cure to form a sealant layer.

2. The method of claim 1, wherein said sealant precursor is disposed inwardly from a supporting carcass and outwardly from an inner liner wherein said sealant precursor consists of, based on its polymer content, 100 parts by weight butyl ionomer rubber composition having a number average molecular weight of 200,000 to 500,000, and a Mooney viscosity (ML 1+8 at 125° C.) ranging from about 25 to 65, about 5 to 35 parts by weight of an oil extender, about 100 parts of calcium carbonate, about 50 parts of silica, and about 1 to 16 parts per hundred rubber (phr) of a peroxide degradation catalyst.

3. The method of claim 1 wherein said peroxide is selected from the group consisting of: butyl 4,4-di(tert-butylperoxy)valerate; 2,5-bis(t-butyl peroxy)-2,5-dimethyl hexane; 1,1-di-t-butyl peroxy-3,3,5-trimethyl cyclohexane; 2,5-dimethyl-2,5 di(t-butyl peroxy) hexyne-3; p-chlorobenzyl peroxide; 2,4-dichlorobenzyl peroxide; 2,2,-bis(t-butyl peroxy)-butane; di-t-butyl peroxide, benzyl peroxide; dicumyl peroxide; and 2,5-dimethyl-2,5di(t-butyl peroxy) hexane.

4. The method of claim 1 wherein said butyl ionomer rubber composition has a number average molecular weight of 300,000 to 400,000.

5. The method of claim 1 wherein said peroxide is a combination of dicumyl peroxide and di(tert-butylperoxy-isopropyl)benzene.

6. The method of claim 1 wherein said green tire is shaped and cured at a temperature ranging from about 132° C. (270° F.) to about 166° C. (330° F.).

7. The method of claim 1 wherein the sealant precursor composition further includes a peroxide activating agent.

8. The method of claim 7, wherein said peroxide activating agent is poly[[6-[1,1,3,3,-tetramethylbutyl)amino]-1,3,5-triazine-2,4-diyl][2,2,6,6,-tetramethyl-4-piperidyl)imino]-1,6-hexanediyl[(2,2,6,6-tetramethyl-4-piperidinyl)imino]].

9. The method of claim 7, wherein said peroxide activating agent is one or more materials selected from poly[[6-[1,1,3,3,-tetramethylbutyl)amino]-s-triazine-2,4-diyl][2,2,6,6,-tetramethyl-4-piperidyl)imino] hexamethylene[(2,2,6,6-tetramethyl-4-piperidyl)imino]] compound; bis (hydrogenated tallow alkyl) amines, oxidized; bis(2,2,6,6-tetramethyl-4-piperidinyl) sebacate.

* * * * *